Patented Feb. 26, 1929.

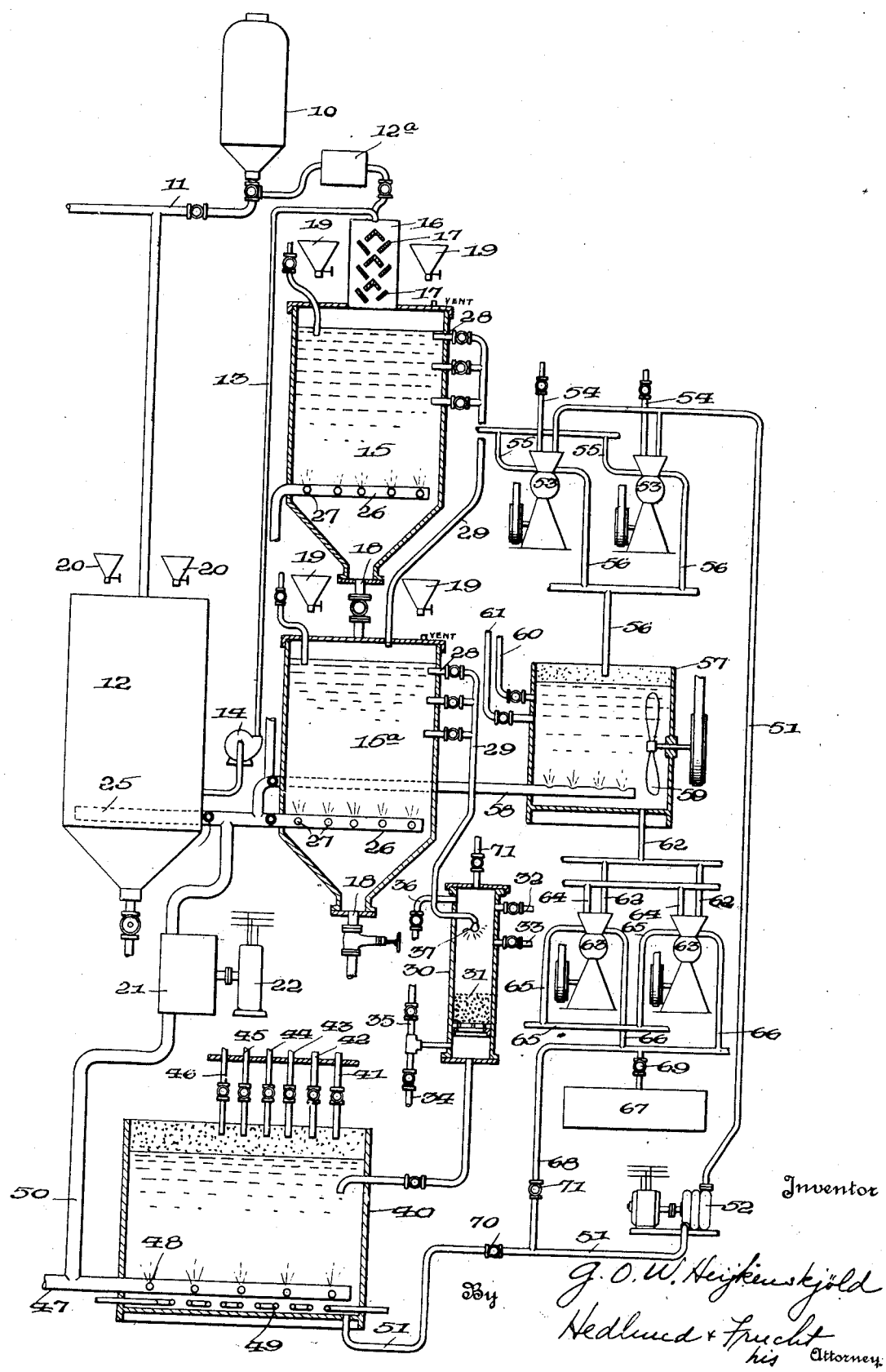

1,703,272

UNITED STATES PATENT OFFICE.

GUSTAF OLOF WOLFGANG HEIJKENSKJÖLD, OF STOCKHOLM, SWEDEN, ASSIGNOR TO AKTIEBOLAGET BÄSTA, OF STOCKHOLM, SWEDEN, A CORPORATION.

YEAST AND ITS MANUFACTURE.

Application filed June 13, 1927, Serial No. 198,614, and in Sweden June 14, 1926.

My invention comprises a novel method and apparatus for manufacturing yeast and has for one object the utilization of the waste liquor of sulphite digesters in producing yeast.

Another object of my invention is the production of a marketable yeast of high quality from waste sulphite liquor.

A third object of my invention comprises a new method for treating waste sulphite liquors to permit yeast propagation therein.

Still another object of my invention resides in the arrangement and construction of the apparatus for carrying out my new method.

With these and other objects in view my invention comprises the method and apparatus hereinafter disclosed and then specifically pointed out in the appended claims.

In order to better illustrate my invention I have in part disclosed the same by means of the accompanying drawing which shows a preferred arrangement of apparatus with which my new method may be carried out.

Referring more particularly to the drawing, 10 designates a wood pulp digester in which pulp is cooked and from which, after the cooking operation, waste sulphite liquor is discharged, the digester shown being intended to generically indicate one or more in which the sulphite process of digesting takes place. Waste sulphite liquor is discharged through conduit 11 and may enter storage tank 12, from which the liquor is pumped through conduit 13 by pump 14 into neutralizing tank 15, the liquor first flowing over the surface cooler and aerator 16.

The liquor from the sulphite digester usually has a temperature greater than 100° C.; instead of entering the storage tank, the hot liquor may be passed directly to the neutralizing tank 15, the temperature being reduced slightly, preferably not below 80° C., by passing through a preheater 12ª, which may be utilized to heat fermented liquor, or liquor cooled during neutralization, for example. The hot liquor may also be cooled by passing over the surface aerator 16. The aerator 16 comprises baffle member 17 affording large surfaces over which the liquor flows downwardly in series, thus presenting a large liquor area for contact with air. The aeration permits oxidation of impurities in the liquor, these impurities precipitating later in the neutralizing tank, reduces the acid content of the liquor, particularly the sulphurous acid content, and concentrates the cooled liquor.

If the waste liquor in neutralizing tank 15, because of storage in tank 12, or due to cooling during the piping to the neutralizing tank, has a temperature less than 80° C., the liquor is heated by any well-known means to from 70° C. to 100° C.

The waste sulphite liquor contains about two and one half per cent of sugar, about twelve per cent of other organic substances, chiefly in colloidal state, and some sulphuric acid. The acidity of the liquor retards new yeast cell development, and is therefore compensated for by the addition of basic acting substances to the liquor. Preferably, the neutralizing agents, such as calcium carbonate, powdered limestone, or "mesa" from a sulphate-cellulose mill, are added in a comminuted form. "Mesa" is a term denoting the sulphate leach or sulphate waste product from sulphate mills, usually comprising about 90% calcium carbonate and small quantities of sodium aluminum hydrate, etc., from the leach used for cooking the sulphate pulp, and is obtained in the form of a grey, comminuted powder.

The addition of neutralizing agents to the neutralizing tank is preferably made in small, successive quantities, discharged through hoppers 19. The use of comminuted agents is preferred, although other alkalies, such as ammonia, may be used, because the powdered agent not only reduces the acidity but also acts as a precipitator, the precipitates formed carrying impurities suspended in the liquor in colloidal form to the bottom of the neutralizing tank during the settling after neutralization is completed.

Air is blown through the body of liquor in tank 15 to maintain the neutralizing agent or agents in close contact with the liquor. The air is supplied by compressor 21 driven by any suitable means, such as electric motor 22, and the compressed air passes through conduits 23, 24 and 26 into the neutralizing tank. A large number of very small holes 27 are provided in conduit 26 in order to obtain small bubbles and thus secure maximum aeration surface.

The aeration is sufficiently powerful to remove free gases and gases liberated during neutralization, such as sulphur dioxide and carbon dioxide, from the liquor, and also oxidizes and precipitates substances in the liquor that would otherwise oxidize and precipitate later, during the yeast propagation, with resultant spoiling of the yeast. The neutralizing reactions are relatively slow, and the aeration of the liquor is continued for at least six hours, and preferably for from twelve to twenty-four hours.

It is possible, if desired, to expedite the work in the neutralizing tank by causing some neutralization within the storage tank 12, hoppers 20 being used to discharge neutralizing agents into the tank, and conduit 25 supplying aeration air.

The neutralization within tank 15 is continued to a point where the reaction obtained on the liquor is substantially homogeneous, and remains constant even when the liquor is stored for a period of time, thus eliminating the risk of further precipitations during the yeast propagation. Tests have shown that during neutralizing the liquor may have very different reactions in different places in the neutralizing tank. Owing to the sinking of the neutralizing agents the liquor may be alkaline at bottom and acid at the top of the tank.

The term neutralizing signifies reducing the acidity of the treated liquor so that the liquor becomes slightly acid, neutral or basic. One form of neutralization is therefore to make the liquor basic or alkaline. Preferably, the liquor is made basic. As limestone is not very effective for this purpose, lime is added, several hours after the addition of the limestone, preferably in the form of a water solution of cream of lime. Other alkalies may also be used, if desired. The neutralization is continued until the liquor reaction is 0.1 to 1.0 basic, preferably 0.5, the degree of alkalinity denoting the number of c. c. of normal acid necessary to neutralize 100 c. c. sulphite liquor when using litmus paper as the indicator. The amount of lime used depends on the acidity of the liquor, and ranges from 0.3 to 5 kilograms per ton of liquor.

When the aeration is completed, the precipitates are removed by separation, by filter presses, or by letting the precipitates settle to the bottom of the tank, the clear liquor being decanted. The settling should be for at least six hours, and preferably for from twelve to twenty-four hours.

To ensure removal of other yeast-injurious substances, such as iron and copper salts, a second precipitation is obtained by adding alkali, such as sodium carbonate or the white alkali, such as sodium carbonate or the white leach used in sulphate mills, to the decanted liquor in a second neutralizing tank 15ª, and aerating. The liquor is preferably hot, as in the preceding neutralization, and the aeration is continued for from one to two hours, at least, after the addition of the alkali. When the liquor is rendered slightly alkaline a large proportion of the iron and copper salts precipitate, but owing to the complicated and varying composition of the waste sulphite liquor, it has proved necessary in practice to raise the alkalinity of the liquor by adding alkali such as sodium carbonate etc. If this procedure is left out, some iron and copper salts remain in the liquor and may be absorbed by the yeast propagated therein. The second neutralization is therefore important. Preferably, the liquor is made so alkaline that acids liberated during the subsequent yeast propagation and acids from the subsequently added nutrients are neutralized by the preheated alkaline sulphite liquor. The liquor may be made 0.2 to 1.0 alkaline, the amount of added alkali ranging from 100 to 800 grams per ton of liquor. Aeration is preferably continued until the reactions caused by the addition of alkali are completed. Tests are periodically made to determine the alkalinity of the liquor, and, if necessary more neutralizing agents are added, sufficient time being allowed to permit completion of the reactions.

When the aeration after the second neutralization has been completed, the precipitates are removed by separating, filtering, or settling and decanting, the settling continuing for at least six hours, but preferably for twelve or more, sufficient time being allowed for completion of the reactions and settling, so that the clear liquor becomes homogeneously alkaline and the degree of alkalinity remains stable, even when the liquor is stored for a period of time. The liquor should behave as a completely dissociated solution, when diluted with water. When the waste sulphite liquor is treated as described with neutralizing and aerating, etc., the liquor will become so stable that it will not dissociate and liberate any H-ions when diluted with water.

Tanks 15 and 15ª are closed tanks, each having an outlet for the air, etc. The air supplied by compressor 21 is preferably sterilized, in order to prevent any infection, as from mold, for example.

The clear liquor is decanted from tank 15ª as it is required for yeast propagation, through pipes 28, the upper parts of the liquor being drawn off first. Conduit 29 carries the liquor to tank 30. Preferably, the liquor is cooled to 25° Celsius, and may therefore be used to heat the unneutralized waste liquor. Tank 30 contains a filtering material 31, which preferably consists of cellulose, cotton, asbestos, or the like. Filtration is not necessary unless the decanted liquor still contains suspended precipitates, and the filter 31 may therefore be omitted. The filter 31 may be cleaned, after having filtered all the liquor necessary for one fermentation, by passing water from pipe 32 downwardly through the filter, and upwardly from pipe 34, the waste water passing off through pipe 130

36. The filter may be sterilized by admitting steam, in a similar manner through pipe 35. The liquor is preferably sprayed into tank 30 as indicated at 37.

Yeast-assimilable nutrients required for the yeast propagation may be added during neutralization, or directly in the propagation tank 40. If added during neutralization, however, large amounts of the nutrients are removed with the precipitates. The nutrients are therefore preferably added after neutralization, but before the liquor enters the fermentation tank, by means of pipes 33, 71, into tank 30. The most suitable nutrients are inorganic salts which will not cause precipitates or color the yeast or the liquor during yeast propagation, such as ammonium sulphate and ammonium-tri-phosphate. The latter salt, may, if necessary, be obtained by the reaction of ammonia, ammonium sulphate, and superphosphate, the precipitates formed being carefully removed before using.

Nutrients may also be added to the propagation tank 40, which receives the liquor from tank 30, through conduit 38, so as to constantly supply such nutrients as are needed by the yeast. Pipes 41 to 46 are therefore used to supply the necessary quantity of nitrogen, phosphorus, etc., both basic and acid reacting nutrients being used to maintain the most suitable propagating condition in the wort. A more acid condition is obtained by adding ammonium sulphate, while a less acid or a basic condition requires the addition of ammonium phosphate. The kinds and amounts of the nutritive substances which are to be added to the yeast during the propagation are chosen with regard to the characteristics of the yeast and of the wort at various times during the propagation in the yeast-propagating tank.

In producing yeast from waste sulphite liquor it has previously proven difficult to obtain good yields in the time normally required for producing yeast from the raw materials hitherto used, the fermenting power of the seed yeast not being sufficient to effect yeast growth at the desired rate in the unfavorable and yeast-toxic nutritive liquor. I have found that the yield can be considerably increased, and the time of propagation much reduced, by first planting the seed yeast in a solution of higher sugar percentage than that of the liquor supplied to the propagation tank.

I therefore begin the yeast propagation by placing a relatively small amount of liquid in tank 40, containing a higher percentage of sugar than the percentage in the heated liquor supplied through conduit 38. This is preferably done by adding molasses to a small amount of the clear sulphite liquor, thus starting the yeast propagation in a more favorable culture medium than the treated sulphite liquor. Other methods, such as concentrating a small portion of the treated sulphite liquor and planting seed yeast in this concentrated solution, may be used. A rapid initial cultivation of yeast results, due to the high percentage of sugar in the concentrated solution.

As the yeast propagation progresses, the treated sulphite liquor, having an alkalinity range of from 0.0 to 1.0, and preferably from 0.3 to 0.6, is gradually and continuously added through conduit 38, the rate of addition being maintained substantially constant during the major part of the propagating. Due to the rapid initial cultivation in the more favorable medium, the yeast cells are in full work at the time the treated liquor is added, and are able to assimilate the sugar and resist the toxines in the liquor.

Preferably, adding of treated sulphite liquor is stopped during the last two hours of yeast propagation, the yeast then ripening in the wort, and absorbing the remaining nourishment therein. It has been found advantageous to reduce the amount of liquor during the two hours preceding the ripening to about half the amount previously added per unit of time. The seed-yeast is planted in a wort, consisting usually of molasses and having an acidity of about 1 degree. As the propagation progresses further acids are liberated by the wort of the yeast, so that when the treated alkaline waste sulphite liquor is added continuously during the propagation the acidity is only reduced by degrees in the yeast wort. The acidity sinks slowly during propagation from about 1 degree acidity to 0.5 and further to 0.2 and often at the end of propagation changes into slight alkalinity. The acidity of the wort is thus reduced as quickly as possible during the propagation, sufficient alkaline nutrients being added to make the final condition of the wort from 0.0 to 0.2 alkaline.

A large amount of air is supplied to tank 40 during the propagation through conduits 47, 48 and 50, the amount being sufficient to prevent the formation of alcohol, to stimulate the cultivation of the yeast, and to drive off any gases injurious to the yeast, such as sulphur dioxide and carbon dioxide. The amount of air required is about 500 cubic feet per hour per square foot of cross-section of the liquor, and may readily be obtained from an air compressor using from 0.5 to 1.0 kilowatt hours per kilogram of yeast yield. The process of fermentation generates considerable heat which is removed by cooling water pipes 49.

If the yeast cultivation is retarded by too high specific weight, acidity, or osmotic pressure, water may be added to dilute the wort.

After ripening, the yeast is withdrawn through conduit 51 by means of pump 52 and forced to the centrifugal separators 53. I have shown the pump 51 merely for convenience of illustration, since it is preferable, whenever feasible, to place the separators below tank 40 and use gravity flow.

The yeast obtained by the above described method of propagation holds about 70% of sulphite liquor between the yeast cells, the cells themselves also comprising liquid that is partly sulphite liquor, the sulphite liquor in both instances being fermented. This liquor I remove by repeated washing and separation.

Water is supplied to separators 53 by conduits 54 for diluting the wort and for replacement of the concentrated wort between yeast cells. The separated wort, diluted, passes out through conduits 55, and the yeast passes through conduits 56 into the purifying and washing tank 57. The yeast is further washed in this tank and is aerated at the same time by air supplied through conduit 58, the air serving to keep the liquid in the tank in continuous motion. If desired, a propeller 59, driven by any suitable means, may be used for this purpose in addition to or simultaneously with the supply of air. Conduits 60 supply water to tank 57 for diluting the remaining sulphite wort and for cleaning the yeast. If necessary, an acid such as hydrochloric acid is added through conduit 61 in order to acidify the yeast to the desired extent.

From tank 57 the yeast and the diluted wort pass through conduits 62 into a second set of separators 63 which operate in similar manner to separators 53. Fresh water is supplied to these separators through conduits 64. The liquid separated in separators 63 passes out through conduits 65 and the yeast passes through conduits 66. Since it is desirable that a repeated separation of the yeast take place it is preferred that, after having gone through separators to the extent described, the yeast be conducted through conduit 68, valves 69 and 70 being closed and valve 71 being open, and thence returned through conduit 51 to separators 53 to again go through the process of separation above outlined. After the yeast has passed through the separators again it is permitted to pass to the usual press indicated by reference character 67, in which latter case valve 69 is open and valve 71 is closed. As above pointed out it is of great importance to the obtaining of good results that the yeast be washed and separated repeatedly so that all or substantially all of the sulphite liquor will be removed from the yeast.

The seed yeast used is prepared separately from the main process in a solution or solutions containing an unusually high degree of nitrogenous matter. The growth of yeast depends in a large measure on the available quantity of albumens and other easily assimilable nitrogen compounds. Yeast cells have the property of being able to store considerable nitrogen which can be utilized for propagation of the yeast when the yeast is placed in a solution which is weak in nitrogen compounds. By thus separately growing yeast in a solution containing a large amount of nitrogen a seed yeast is produced which is capable of rapid growth in sulphite liquor which may be relatively weak in nitrogen because the seed yeast can make use of the nitrogen stored up in itself. This growth of seed yeast in a manner to cause the same to accumulate nitrogen I term super-nourishment.

The super-nourishment of the seed yeast should be carried as far as possible, and beyond 2.3% nitrogen content of the seed yeast. A less expensive seed yeast may be prepared by cultivating the seed yeast once or twice in treated sulphite liquor, thus greatly increasing the nitrogen content and often increasing the yeast yield.

A brief outline of the preferred method is as follows:

1. Hot waste sulphite liquor from a sulphite digester is aerated, cooled to about 90 degrees Celsius, and led to a neutralizing tank.

2. Comminuted limestone is added to the hot waste sulphite liquor under aeration to reduce the acidity of the liquor to about one degree acid.

3. Lime is then added to the liquor under aeration to such a degree that the liquor remains alkaline after 12 hours' aeration, litmus being used as indicator.

4. The liquor, having been aerated for at least 12 hours so as to complete the reactions caused, may be left standing still so that the formed precipitations settle during about 24 hours.

5. The liquor may be decanted to another tank, if desired; and sodium carbonate is added, with aeration so that the liquor becomes still more alkaline, above 0.3 alkalinity, the temperature of the liquor being preferably 30 to 50° C.

6. The aeration of the liquor is continued for 6 to 12 hours until the reactions caused are completed and the degree of alkalinity becomes constant; otherwise the addition of sodium and the aeration is continued until the liquor is stabilized.

7. Propagation of yeast is started in a solution of molasses and nutrients. The amount of molasses is about 0.5 percent of the amount of sulphite liquor in which the propagation of yeast is to be continued. The molasses solution is rather highly concentrated to about 4–5 degrees Balling.

8. As soon as the development of the yeast cells has started, after one hour or two, the treated sulphite liquor and nutrients are added continuously during the propagation, about twelve hours, whereupon the addition is gradually diminished and two hours later stopped. The sulphite liquor is filtered through malt sprouts or other filter material on the way to the fermentation tank. The nutrients used are ammonium sulphate and ammonium phosphate principally, and if desired, small amounts of ammonia and sulphuric acid.

9. During the propagation and the cultivation of the yeast a great quantity of air is blown through the liquor to stimulate cultivation of yeast and prevent formation of alcohol, the volume of air being usually more than 400 cubic feet of air per hour per square foot of cross-section of the body of liquor through which the air is blown.

10. The seed yeast used for the yeast-propagation is made either by using molasses or grain as raw material, or in the way above set forth, out of waste sulphite liquor, in both cases with the wort containing a high concentration of yeast-assimilable chemically combined nitrogen, so that the seed yeast becomes supernourished with nitrogen, usually to more than 2.5% nitrogen.

11. The propagation of yeast being completed, the yeast is separated from the wort, is diluted with water, washed by aerating the solution, again separated, washed with water and separated until the last residues of sulphite liquor are removed from the yeast cells. Usually, four to six washings and separations are required to eliminate the sulphite liquor and to obtain commercially pure yeast.

While I have described in detail the preferred embodiment of my invention, it is to be understood that the invention is not limited to the precise method and apparatus disclosed, but may be varied in various aspects and that various of the novel steps of my method may be used in combination with other known steps instead of those set out.

Having thus described my invention, what I claim is:

1. In a method for treating hot waste sulphite liquors obtained from digested wood for propagation of yeast, the steps of adding neutralizing agents to reduce the acidity of hot liquor from the digester at least to the neutral point, and aerating the liquor during treatment until the neutralizing reactions are completed.

2. In a method for treating hot waste sulphite liquor for propagation of yeast, the step of adding neutralizing agents to the hot liquor in such amount while aerating it that the liquor even after having been aerated has an alkaline reaction.

3. In a method for treating hot waste sulphite liquor for propagation of yeast, adding neutralizing agents to the hot liquor while aerating the same, and continuing the treatment until the treated liquor shows a stable alkaline reaction.

4. In a method of treating hot waste sulphite liquor for propagation of yeast, adding neutralizing agents to the hot liquor while aerating the same, until the treated liquor shows a stable alkaline reaction, said aeration being sufficiently powerful to drive out free gases in the liquor and gases formed during the neutralizing reaction.

5. In a method of treating hot waste sulphite liquor obtained from digested wood for propagation of yeast, the steps of adding neutralizing agents to hot liquor from the digester to reduce the acidity thereof at least to the neutral point and aerating the liquor during at least six hours counted from the beginning of the addition of neutralizing agents.

6. In a method of treating waste sulphite liquor obtained from digested wood for propagation of yeast, neutralizing the hot liquor from the digester at least to the neutral point, aerating the liquor during neutralization, thereby forming precipitates, settling the precipitates during at least six hours, and removing the precipitates.

7. In a method of treating waste sulphite liquor for propagation of yeast, neutralizing the liquor by means of a comminuted precipitate-forming basic acting substance, adding alkali to make the treated liquor alkaline, and aerating the liquor during the resulting reactions.

8. In a method of treating waste sulphite liquor for propagation of yeast, the steps of adding to the hot liquor while aerating the same at least 8 pounds of powdered limestone per ton and adding at least 0.6 pounds of lime per ton liquor to make the treated liquor alkaline and aerating the liquor until the neutralizing reactions are completed.

9. In a method of treating waste sulphite liquor for propagation of yeast, neutralizing the liquor by means of a comminuted precipitate-forming basic acting substance, and adding alkali to bring the final alkalinity of the treated liquor to from 0.1 to 2.0 alkalinity.

10. In a method of treating waste sulphite liquor for propagation of yeast, the steps of adding neutralizing agents to the hot liquor while aerating the same until the treated liquor has an alkaline reaction, adding said treated liquor to a yeast propagating mass in such amounts as to maintain the desired reactions during the propagation.

11. In a method of treating waste sulphite liquor for propagation of yeast, neutralizing and aerating the liquor, removing precipitates, adding alkali to the clear treated liquor to render such liquor alkaline and to precipitate yeast-injurious substances while aerating the same, and removing the additional precipitates formed.

12. In a method of treating waste sulphite liquor for propagation of yeast, neutralizing and aerating the liquor while maintaining it at high temperature until the treated liquor shows a stable alkaline reaction, adding alkali to and aerating the treated liquor to precipitate yeast injurious substances and removing the precipitates formed.

13. In a method of treating waste sulphite liquor for propagation of yeast, neutralizing and aerating the liquor, removing the formed precipitates and adding to the clear liquor a quantity of alkali corresponding to minimum 0.2 pounds of carbonate of sodium per ton liquor to precipitate yeast-injurious substances.

14. In a method of treating waste sulphite liquor for propagation of yeast, neutralizing and aerating the liquor, removing precipitates and adding to the clear liquor an alkaline substance to precipitate yeast-injurious substances and aerating the liquor during at least two hours.

15. In a method of cultivating yeast with treated sulphite liquor, neutralizing the waste sulphite liquor while maintaining it at a temperature of from 70 to 100° C. treating the neutralized liquor to precipitate yeast-injurious substances and using the treated liquor to supply yeast nutrients to propagating yeast.

16. In a method of cultivating yeast with waste sulphite liquor treated to make it alkaline and to remove yeast-injurious substances, supplementing the yeast nutrients present in the so treated liquor by adding other yeast nutrients having no precipitate forming or yeast coloring properties.

17. In a method of treating waste sulphite liquor for yeast cultivation, neutralizing the sulphite liquor and removing precipitates, precipitating yeast deleterious substances from the resulting clear liquor, removing the second precipitates, and adding yeast nutrients to the treated liquor.

18. In a method of treating waste sulphite liquor for yeast cultivation, neutralizing the sulphite liquor while maintaining it at high temperature, and removing precipitates, precipitating yeast deleterious substances from the resulting clear liquor while maintaining it at high temperatures, removing the second precipitates, and adding yeast nutrients to the treated liquor.

19. In a method of using waste sulphite liquor for yeast cultivation, treating the liquor to make it alkaline and to precipitate yeast injurious substances, supplementing the yeast nutrients present in the so treated liquor, by adding ammonium phosphate to compensate for lack of phosphorus in the treated sulphite liquor.

20. In a method of cultivating yeast with waste sulphite liquor treated to make it alkaline and to remove yeast injurious substances, supplementing the yeast nutrients in the so treated liquor by adding other yeast nutrients having no precipitate forming or yeast coloring properties, and regulating the acidity or alkalinity of the wort during yeast propagation by adding basic or acid reacting nutrients.

21. In a method of cultivating yeast in treated waste sulphite liquor, neutralizing the liquor until it becomes alkaline and removing the precipitates formed thereby, adding the treated liquor to yeast propagating wort, and regulating the character of the wort so that the wort at the end of propagation is 0.0 to 0.2 alkaline.

22. In a method of cultivating yeast in treated waste sulphite liquor, starting propagation of yeast in a yeast nutrient solution, adding sulphite liquor treated to be alkaline and to remove yeast-injurious substances to the wort to maintain and continue the propagation, the addition being at substantially a constant rate, diminishing the rate of addition towards the end of propagation, and ripening the yeast in the wort.

23. In a method of cultivating yeast with treated waste sulphite liquor, neutralizing the liquor, adding the treated liquor to yeast propagating in a highly nutrient solution to form a wort, and aerating the wort so vigorously as to prevent formation of alcohol and to remove yeast injurious gases liberated during propagation.

24. In a method of cultivating yeast with treated waste sulphite liquor, starting propagation of yeast in a yeast nutrient solution to form a wort, adding treated sulphite liquor to the wort to maintain and continue the propagation, aerating the wort so vigorously as to prevent formation of alcohol and to remove yeast injurious gases liberated during propagation, and diluting the wort with water to lower the acidity, the specific weight, and the osmotic pressure of the wort when necessary.

25. In a method of cultivating yeast with treated waste sulphite liquor, neutralizing waste sulphite liquor and removing the formed precipitates, precipitating yeast injurious substances from the neutralized liquor, and continually adding the so treated liquor to a wort in which yeast is being propagated to maintain said yeast propagation, the liquor being alkaline throughout.

26. In a method of cultivating yeast with treated sulphite liquor, supernourishing seed yeast by propagating it in concentrated sulphite liquor treated to be alkaline and freed of yeast-injurious substances, using the supernourished yeast to initiate cultivation in a highly nutrient medium, and adding neutralized sulphite liquor to continue the cultivation.

27. In a method of cultivating yeast with waste sulphite liquor, neutralizing the liquor, removing yeast-injurious substances therefrom, adding so treated liquor at a substantially constant rate to yeast propagating in a nutrient solution and aerating the wort with at least 600 cubic feet of air per hour per square foot of bottom surface of the propagation tank.

28. In a method for treating hot waste sulphite liquors obtained from digested wood for propagation of yeast, the steps of adding neutralizing agents to reduce the acidity of hot liquor from the digester at least to the neutral point, one of said agents producing a precipitate, and aerating the liquor during treatment until the neutralizing reactions are completed.

29. In a method for treating hot waste sulphite liquor for propagation of yeast, the step of adding neutralizing agents to the hot liquor while aerating it, one of said agents producing a precipitate, in such amount that the liquor even after having been aerated has an alkaline reaction.

30. In a method for treating hot waste sulphite liquor for propagation of yeast, adding neutralizing agents to the hot liquor while aerating the same, one of said agents producing a precipitate, and continuing the treatment until the treated liquor shows a stable alkaline reaction.

31. In a method of treating hot waste sulphite liquor for propagation of yeast, adding neutralizing agents to the hot liquor while aerating the same, one of said agents producing a precipitate, until the treated liquor shows a stable alkaline reaction, said aeration being sufficiently powerful to drive out free gases in the liquor and gases formed during the neutralizing reaction.

32. In a method of treating hot waste sulphite liquor obtained from digested wood for propagation of yeast, the steps of adding neutralizing agents to hot liquor from the digester to reduce the acidity thereof at least to the neutral point and aerating the liquor during at least six hours counted from the beginning of the addition of neutralizing agents, one of said agents producing a precipitate.

33. In a method of treating waste sulphite liquor for propagation of yeast, neutralizing and aerating the liquor, adding alkali to render the liquor alkaline while aerating the same, and removing precipitates.

34. In a method of cultivating yeast in treated waste sulphite liquor, neutralizing the liquor until it becomes alkaline, removing precipitates, adding the so treated liquor to yeast propagating wort, and regulating the character of the wort so that the wort at the end of propagation is at least 0.0 alkaline.

Signed at Stockholm this 20 day of May, 1927.

GUSTAF OLOF WOLFGANG HEIJKENSKJÖLD.